United States Patent
Anderson et al.

(10) Patent No.: US 11,081,011 B1
(45) Date of Patent: *Aug. 3, 2021

(54) AIRCRAFT SYSTEM AND METHOD TO PROVIDE GRAPHICAL THRESHOLD RANGE INDICATOR

(71) Applicant: Rockwell Collins, Inc., Cedar Rapids, IA (US)

(72) Inventors: Eric N. Anderson, Marion, IA (US); Keith A. Stover, Lisbon, IA (US); Timothy R. Fannin, Urbana, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,576

(22) Filed: Jun. 5, 2020

(51) Int. Cl.
*G08G 5/00* (2006.01)

(52) U.S. Cl.
CPC ......... *G08G 5/0021* (2013.01); *G08G 5/0013* (2013.01)

(58) Field of Classification Search
CPC ..................................................... G01C 21/20
See application file for complete search history.

(56) References Cited

U.S. PATENT DOCUMENTS

| | | |
|---|---|---|
| 5,179,377 A | 1/1993 | Hancock |
| 6,911,936 B2 | 6/2005 | Stayton et al. |
| 8,099,201 B1 | 1/2012 | Barber et al. |
| 9,437,112 B1 | 9/2016 | Greene |
| 9,472,109 B2 | 10/2016 | Starr et al. |
| 9,501,936 B2 | 11/2016 | Trefilova et al. |
| 10,490,089 B2 | 11/2019 | Khatwa et al. |
| 10,971,020 B1* | 4/2021 | Fannin .................. G08G 5/0078 |
| 2007/0219831 A1* | 9/2007 | Ne'meth ................ G06Q 40/08 705/4 |

(Continued)

FOREIGN PATENT DOCUMENTS

EP 2666150 B1 3/2010

OTHER PUBLICATIONS

United States Department of Transportation: Federal Aviation Administration, "Airworthiness Approval for ADS-B in Systems and Applications", pp. 19-22, Document 20-172B, May 20, 2015.

(Continued)

*Primary Examiner* — Nabil H Syed
*Assistant Examiner* — Cal J Eustaquio
(74) *Attorney, Agent, or Firm* — Suiter Swantz pc llo

(57) ABSTRACT

A system may include a display and a processor. The display may be configured to present images to a user, the display in an ownship. The processor may be communicatively coupled to the display and in the ownship. The processor may be configured to: receive aircraft traffic data and ownship data; at least one of determine or adjust a threshold range based at least on the aircraft traffic data and the ownship data, the threshold range representing a time or distance threshold to designated traffic; generate and update a graphical threshold indicator, the threshold indicator representing a time or distance from the threshold range to the designated traffic; and output the graphical threshold indicator as graphical data to the display. The display may be configured to display the graphical threshold indicator to the user.

17 Claims, 5 Drawing Sheets

(56) References Cited

U.S. PATENT DOCUMENTS

| | | | |
|---|---|---|---|
| 2009/0109065 A1* | 4/2009 | Pinheiro | G08G 5/0078 |
| | | | 340/971 |
| 2016/0112732 A1 | 1/2016 | Shanbhag et al. | |
| 2017/0183104 A1 | 6/2017 | Colby | |
| 2019/0019422 A1* | 1/2019 | Khatwa | G08G 5/0008 |
| 2019/0340936 A1 | 11/2019 | Manberg et al. | |
| 2019/0362690 A1 | 11/2019 | Bouda et al. | |

OTHER PUBLICATIONS

United States Department of Transportation: Federal Aviation Administration, "Automatic Dependent Surveillance-Broadcast Operations", Appendix 3, p. 2, Document 90-114A, Mar. 7, 2016.

Kim, Kyungtae et al., "Beacon-Less Operation and Idle Ping Slot Control for Low Power Communication in LoRaWAN", KIPS Tr. Comp. and Comm. Sys., vol. 6, No. 5, pp. 231-238, Accessed Apr. 28, 2020.

Bone, Randall S. et al., MITRE, "Air Traffic Controller and Flight Crew Conduct of a No-Closer-Than Spacing Task Utilizing a Cockpit Display of Traffic Information", 33 pages, Document MITRI50066, Mar. 2015.

* cited by examiner

AIRCRAFT SYSTEM AND METHOD TO PROVIDE GRAPHICAL THRESHOLD RANGE INDICATOR

BACKGROUND

Advanced traffic applications are being defined in the industry for more efficient management and spacing of aircraft traffic into, and within, crowded airspace. Most of these applications require the flight crew to manage a tight spacing relative to other aircraft in either distance or time but provide only a minimum set of data to the crew. Currently, traffic identification and separation monitoring are used during visual flight rules (VFR) operations. According to current operational procedures for VFR approaches, air traffic control (ATC) does not provide clearance ranges to flight crews.

SUMMARY

In one aspect, embodiments of the inventive concepts disclosed herein are directed to a system. The system may include a display and a processor. The display may be configured to present images to a user, the display in an ownship. The processor may be communicatively coupled to the display and in the ownship. The processor may be configured to: receive aircraft traffic data and ownship data; at least one of determine or adjust a threshold range based at least on the aircraft traffic data and the ownship data, the threshold range representing a time or distance threshold to designated traffic; generate and update a graphical threshold indicator, the threshold indicator representing a time or distance from the threshold range to the designated traffic; and output the graphical threshold indicator as graphical data to the display. The display may be configured to display the graphical threshold indicator to the user.

In a further aspect, embodiments of the inventive concepts disclosed herein are directed to a method. The method may include: receiving, by a processor communicatively coupled to a display, aircraft traffic data and ownship data, the display configured to present images to a user, the processor and the display in an ownship; at least one of determining or adjusting, by the processor, a threshold range based at least on the aircraft traffic data and the ownship data, the threshold range representing a time or distance threshold to designated traffic; generating and updating, by the processor, a graphical threshold indicator, the threshold indicator representing a time or distance from the threshold range to the designated traffic; outputting, by the processor, the graphical threshold indicator as graphical data to the display; and displaying, by the display, the graphical threshold indicator to the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
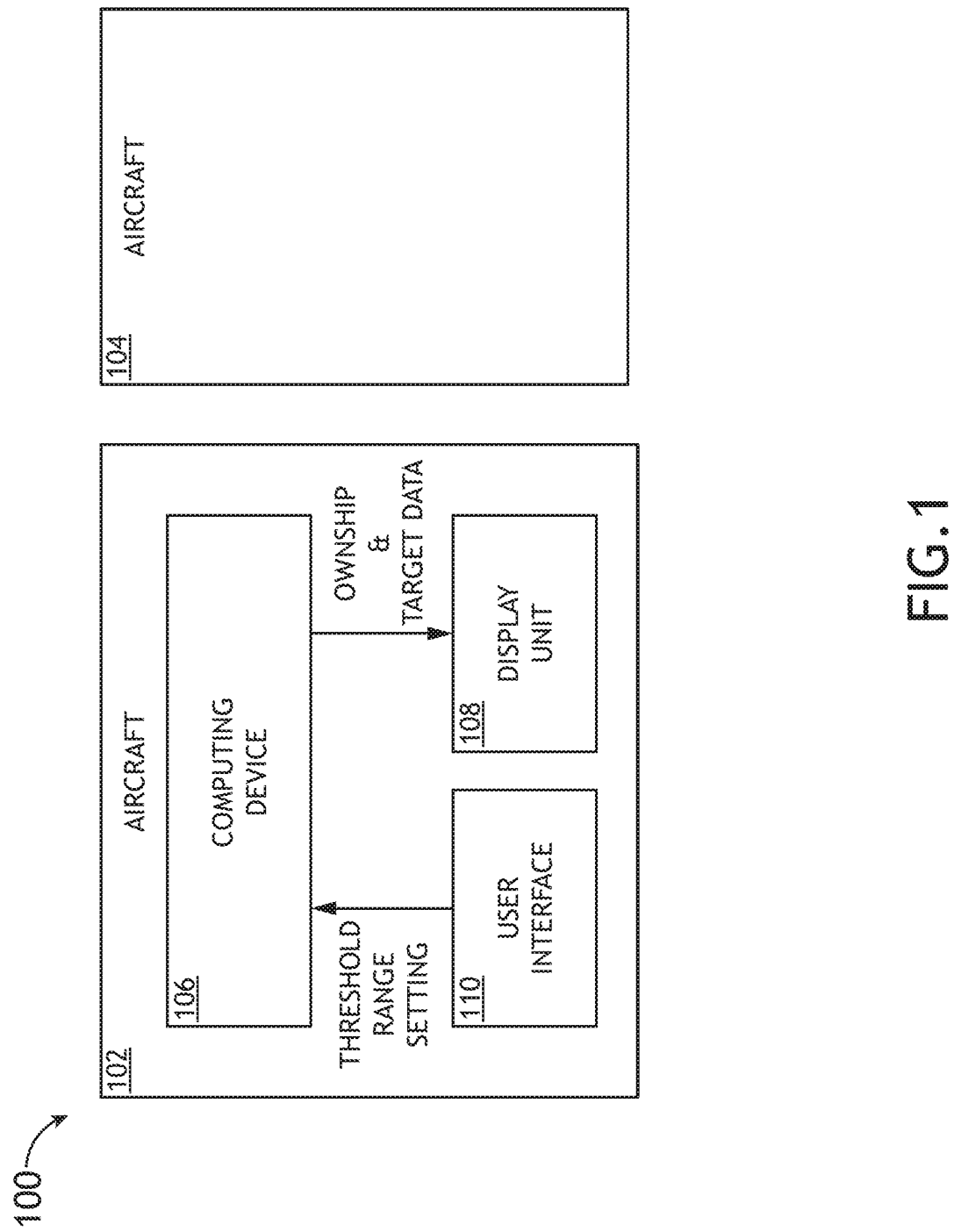
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein may be directed to a system and a method configured to provide a threshold range and a graphical threshold indicator.

Currently, the minimum operating standard (MOPS) for CAVS requires the crew to enter in a desired threshold range from a designated target. This value is not provided by ATC. Some embodiments may include an automated selection of a threshold range for a traffic application, such as a cockpit display of traffic information (CDTI)-assisted visual separation (CAVS) application, an automatic dependent surveillance-broadcast incoming (ADS-B In) application, or a flight-deck interval management (FIM) application. Some embodiments may automatically set the threshold range based on a distance or time from the designated target. For example, a threshold range of 1 nautical mile (NM) may be less than the distance to the target under nominal closure rates to potentially provide at least 2 minutes before alerting the crew. Some embodiments may include bounding the calculated threshold ranges to reasonable values for VFR (e.g., between 2 NM and 6 NM). Some embodiments may include using closure rate information and/or airplane position information to set such a range based on desired separation in time or distance.

Some embodiments may reduce crew workload and simplify user experience and human machine interface (HMI) while meeting the MOPS requirements for CAVS traffic applications. Some embodiments may improve safety of flight approaches while increasing the rate at which approaches can be completed. Some embodiments may simplify management of threshold range selection at a systems level by eliminating mastership issues. Additionally, some embodiments make it easier to use low integrity personal electronic devices, such as tablet computing devices, to support retrofit and forward-fit traffic applications.

Figure 2:
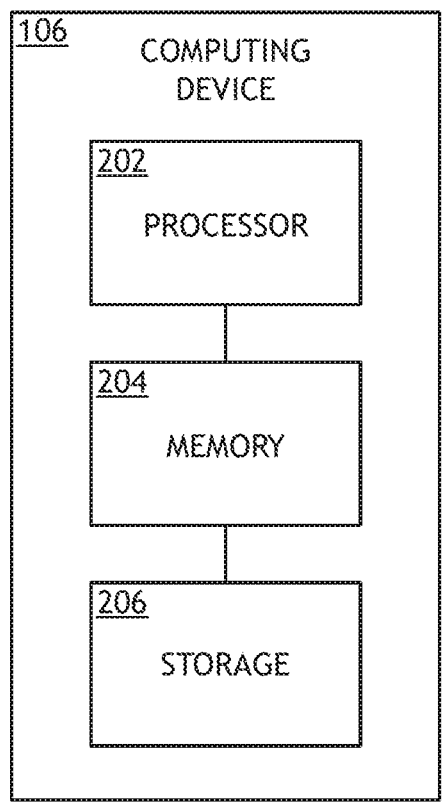
FIG. 2 is a view of the computing device of the system of FIG. 1 according to the inventive concepts disclosed herein.
Figure 3:
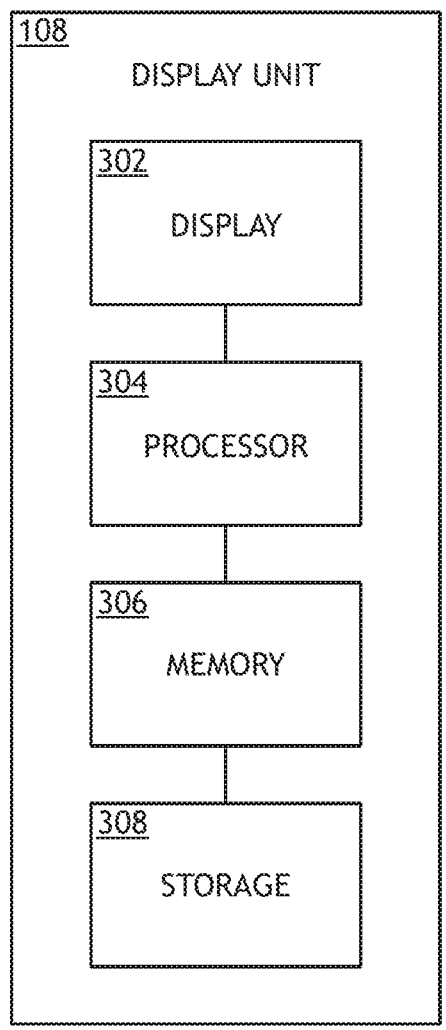
FIG. 3 is a view of the display unit of the system of FIG. 1 according to the inventive concepts disclosed herein.

Referring now to FIGS. 1-3, an exemplary embodiment of a system 100 according to the inventive concepts disclosed herein is depicted. In some embodiments, the system 100 may include a first aircraft 102 (e.g., an ownship) and at least one other aircraft 104 (e.g., designated traffic), some or all of which may be in communication with each other at any given time. The aircraft 102 may include at least one user (e.g., a pilot, a crew member, and/or an operator), at least one computing device 106, at least one display unit computing device 108, and/or at least one user interface 110, as well as any other equipment commonly found on an aircraft, some or all of which may be communicatively coupled at any given time. In some embodiments, the at least one display unit computing device 108, the at least one computing device 106, and/or the at least one user interface 110 may be implemented as a single computing device or any number of computing devices configured to perform (e.g., collectively perform if more than one computing device) any or all of the operations disclosed throughout.

The at least one computing device 106 may be implemented as any suitable computing device, such as a traffic computing device. For example, the computing device 106 may include at least one processor 202, at least one memory 204, at least one storage 206, and/or any suitable user interface(s), some or all of which may be communicatively coupled at any given time. For example, the at least one processor 202 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 202 may include a CPU and a GPU configured to perform (e.g., collectively perform) any of the operations disclosed throughout. The processor 202 may be configured to run various software applications (e.g., a traffic application, an ADS-B In application, a CAVS application, and/or a FIM application) or computer code stored (e.g., maintained) in a non-transitory computer-readable medium (e.g., memory 204 and/or storage 206) and configured to execute various instructions or operations. The processor 202 of the computing device 106 may be configured to perform any or all of the operations disclosed throughout. For example, the processor 202 of the computing device 106 may be configured to: output aircraft traffic data and/or ownship data to the display unit computing device 108; receive an initial, determined, or adjusted threshold range value; receive a designated traffic target selection (e.g., selected by a user); and/or output designated traffic target information and/or alert(s). For example, the traffic data may be or may be derived from ADS-B In data, and the traffic data may include information related to designated traffic (e.g., aircraft 104), such as position, speed, trajectory, and/or heading. For example, the ownship data may include information related to the ownship's (e.g., aircraft 102) position, speed, trajectory, and/or heading.

The display unit computing device 108 may be any suitable computing device having at least one display 302, such as a PFD, an MFW display, an HUD, an HDD, and/or a portable computing device display (e.g., a display of a laptop computer, a tablet computing device, or a phone computing device). As shown in FIG. 3, the display unit computing device 108 may include at least one display 302, at least one processor 304, at least one memory 306, and/or at least one storage 308, some or all of which may be communicatively coupled at any given time. For example, the at least one processor 304 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 304 may include a CPU and a GPU configured to perform (e.g., collectively perform) any of the operations disclosed throughout. The processor 304 may be configured to run various software applications (e.g., a PFD application and/or an MFW application) or computer code stored (e.g., maintained) in a non-transitory computer-readable medium (e.g., memory 306 and/or storage 308) and configured to execute various instructions or operations. The processor 304 may be configured to perform any or all of the operations disclosed throughout. For example, the processor 304 may be configured to: receive the traffic data and/or ownship data from the computing device 106; at least one of determine or adjust a threshold range based at least on the aircraft traffic data and the ownship data, the threshold range representing a time or distance threshold to designated traffic; generate and update a graphical threshold indicator (e.g., 402), the threshold indicator representing a time or distance from the threshold range to the designated traffic; output the graphical threshold indicator (e.g., 402) and/or a map (e.g., linear map 400) as graphical data to the display 302; receive the designated traffic target information and/or alert(s); and/or display the designated traffic target information and/or alert(s). The display 302 may be configured to display the graphical threshold indicator (e.g., 402) to the user.

The at least one user interface 110 may be interfaceable by a user, such as a pilot or crew member. The at least one user interface 804 may be implemented as any suitable user interface, such as a touchscreen (e.g., of the display unit computing device 108 and/or another display unit), a multipurpose control panel, a cursor control panel, a keyboard, a mouse, a trackpad, a button, a switch, an eye tracking system, and/or a voice recognition system. The user interface 110 may be configured to receive a user selection and to output the user selection to a computing device (e.g., the display unit computing device 108 and/or the computing device 106).

For example, at least one processor (e.g., the at least one processor 202 and/or the at least one processor 304) may be configured to: receive aircraft traffic data and ownship data; at least one of determine or adjust a threshold range based at least on the aircraft traffic data and the ownship data, the threshold range representing a time or distance threshold to designated traffic; generate and update a graphical threshold indicator, the threshold indicator representing a time or distance from the threshold range to the designated traffic; and/or output the graphical threshold indicator as graphical data to the display.

In some embodiments, the at least one processor (e.g., the at least one processor 202 and/or the at least one processor 304) may be further configured to: execute a traffic application (e.g., a CAVS application).

In some embodiments, the at least one processor (e.g., the at least one processor 202 and/or the at least one processor 304) may be further configured to: receive an initial value for the threshold range from the user and to adjust the threshold range.

In some embodiments, the at least one processor (e.g., the at least one processor 202 and/or the at least one processor 304) may be further configured to: determine the threshold range, to receive a user input to adjust the threshold range, and to adjust the threshold range.

In some embodiments, the at least one processor (e.g., the at least one processor 202 and/or the at least one processor 304) may be further configured to: at least one of determine or adjust the threshold range based at least on the aircraft traffic data, the ownship data, and a fixed offset from a range to the designated traffic, the range being a time or distance between the ownship and the designated traffic. For example, the threshold range may be determined to be 1 nautical mile (NM) less than a range to the designated traffic at activation of the CAVS application. For example, the threshold range may be determined to be at distance corresponding to a 1 minute reduction in spacing between the ownship and the designated traffic. For example, when the fixed offset is a distance, the fixed offset may be any fixed distance value, including 0, positive, or negative numbers. For example, when the fixed offset is a time value, the fixed offset may be any fixed time value, including 0, positive, or negative numbers.

In some embodiments, the at least one processor (e.g., the at least one processor 202 and/or the at least one processor 304) may be further configured to: at least one of determine or adjust the threshold range based at least on the aircraft traffic data, the ownship data, a closure rate between the ownship and the designated traffic, and a range, the range being a time or distance between the ownship and the designated traffic. For example, current closure rate and the current range may be used to determine the threshold range from a projected future range.

In some embodiments, the at least one processor (e.g., the at least one processor 202 and/or the at least one processor 304) may be further configured to: at least one of determine or adjust the threshold range based at least on the aircraft traffic data, the ownship data, and a predetermined distance or time interval. For example, the threshold range may be set at 5 NM (or any predetermined fixed range). For example, the threshold range may be set at a range corresponding to 90 seconds (or any predetermined fixed time).

In some embodiments, the at least one processor (e.g., the at least one processor 202 and/or the at least one processor 304) may be further configured to: at least one of determine or adjust the threshold range based at least on the aircraft traffic data, the ownship data, and wake separation standards for the ownship and the designated traffic. For example, the threshold range may be set at a range of 5 NM for a "Large" ownship following a "Heavy" designated traffic. For example, the threshold range may be set at a range of 3 NM for a "Heavy" ownship following a "Large" designated traffic.

In some embodiments, the at least one processor (e.g., the at least one processor 202 and/or the at least one processor 304) may be further configured to: at least one of determine or adjust the threshold range based at least on the aircraft traffic data, the ownship data, and a time or distance between a location and the ownship. For example, the location may be an airport. For example, the threshold range may be set to 0.5 NM when within 30 NM of a specific airport.

In some embodiments, the threshold range may be limited to be within a predetermined range of values. For example, the predetermined range of values may be a predetermined reasonable range of values.

In some embodiments, the at least one processor (e.g., the at least one processor 202 and/or the at least one processor 304) may be further configured to use any combination of the foregoing methods and/or factors of determining the threshold range.

For example, the threshold range determination may be set using a fixed offset, unless the designated traffic is "Heavy" (in which case set the threshold range to 5 NM) or unless the designated traffic is "Super" (in which case set the threshold range to 8 NM).

For example, the at least one processor (e.g., the at least one processor 202 and/or the at least one processor 304) may be further configured to execute a cockpit display of traffic information (CDTI)-assisted visual separation (CAVS) application, wherein the at least one processor may be further configured to at least one of determine or adjust the threshold range based at least on: the aircraft traffic data; the ownship data; a range, the range being a time or distance between the ownship and the designated traffic; a fixed offset from the range to the designated traffic; a closure rate between the ownship and the designated traffic; wake separation standards for the ownship and the designated traffic; and/or a time or distance between a location (e.g., a an airport) and the ownship; wherein the threshold range may be limited to be within a predetermined range of values.

Figure 4:
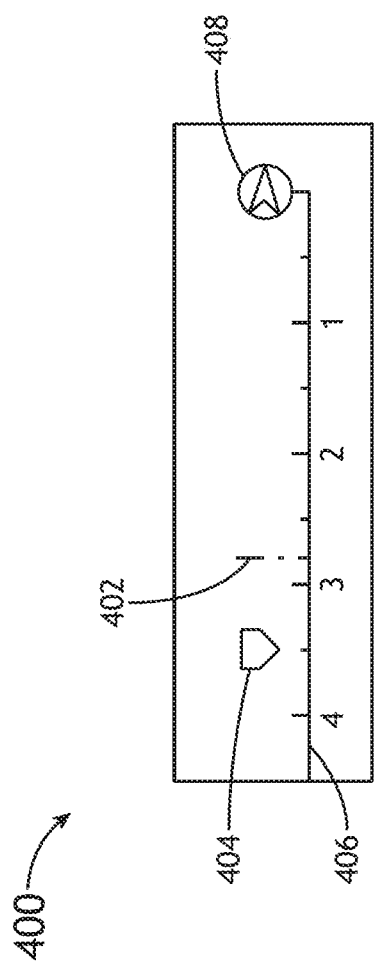
FIG. 4 is a view of an exemplary embodiment of the display unit of FIG. 3 displaying an exemplary map according to the inventive concepts disclosed herein.

Referring now to FIG. 4, an exemplary embodiment of the display unit computing device 108 displaying a map (e.g., a linear map 400) according to the inventive concepts disclosed herein is depicted. The linear map 400 may depict a one-dimensional (e.g., horizontal) relationship between ownship (e.g., aircraft 102) and designated traffic (e.g., aircraft 104) For example, the linear map 400 may include a plurality of graphical elements, such as at least one threshold indicator 402, an ownship indicator 404 (e.g., an ownship pointer), a scale 406, and/or designated traffic indicator 408.

Each of the at least one threshold indicator 402 may be a graphical depiction of a distance or time threshold, which represents a time or distance from the threshold to the designated traffic. Each threshold can be set by the flight crew and/or computed by a computing device (e.g., 106 or 108). The graphical appearance of each threshold indicator 402 may vary, for example, depending on a type of threshold (e.g., advisory or alert) or on a relationship of ownship relative to the threshold (e.g., ownship outside the threshold or inside the threshold). More than one threshold indicator 402 may appear on the linear map 400, for example, depending on the traffic application being used and a specific situation.

The ownship indicator 404 may be a graphical symbol depicting ownship.

The scale 406 may represent the distance or time to the designated traffic.

The designated traffic indicator 408 may be a graphical symbol depicting designated traffic (e.g., aircraft 104).

Figure 5:
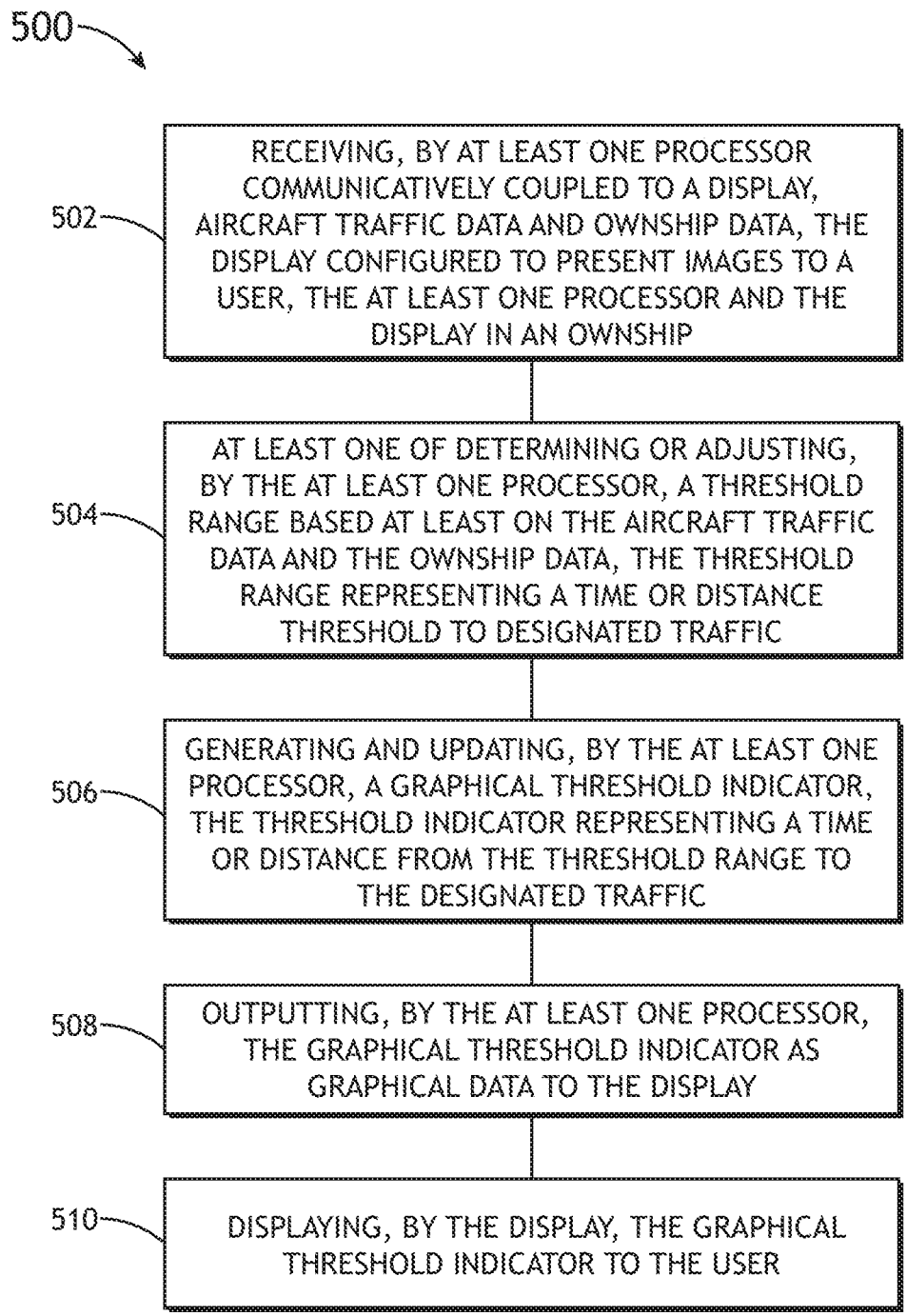
FIG. 5 is a diagram of an exemplary embodiment of a method according to the inventive concepts disclosed herein.

Referring now to FIG. 5, an exemplary embodiment of a method 500 according to the inventive concepts disclosed herein may include one or more of the following steps. Additionally, for example, some embodiments may include performing one or more instances of the method 500 iteratively, concurrently, and/or sequentially. Additionally, for example, at least some of the steps of the method 500 may be performed in parallel and/or concurrently. Additionally, in some embodiments, at least some of the steps of the method 500 may be performed non-sequentially.

A step 502 may include receiving, by at least one processor communicatively coupled to a display, aircraft traffic data and ownship data, the display configured to present images to a user, the at least one processor and the display in an ownship.

A step 504 may include at least one of determining or adjusting, by the at least one processor, a threshold range based at least on the aircraft traffic data and the ownship data, the threshold range representing a time or distance threshold to designated traffic.

A step 506 may include generating and updating, by the at least one processor, a graphical threshold indicator, the threshold indicator representing a time or distance from the threshold range to the designated traffic.

A step 508 may include outputting, by the at least one processor, the graphical threshold indicator as graphical data to the display.

A step 510 may include displaying, by the display, the graphical threshold indicator to the user.

Further, the method 500 may include any of the operations disclosed throughout.

As will be appreciated from the above, embodiments of the inventive concepts disclosed herein may be directed to a system and a method configured to provide a threshold range and a graphical threshold indicator.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display configured to present images to a user, the display in an ownship; and
at least one processor communicatively coupled to the display, the at least one processor in the ownship, the at least one processor configured to:
receive aircraft traffic data and ownship data;

at least one of determine or adjust a threshold range based at least on the aircraft traffic data and the ownship data, the threshold range representing a time or distance threshold to designated traffic;

generate and update a linear map including a graphical threshold indicator, the threshold indicator representing a time or distance from the threshold range to the designated traffic, the linear map depicting a one-dimensional relationship between the ownship and the designated traffic; and output the linear map including the graphical threshold indicator as graphical data to the display;

wherein the display is configured to display the linear map including the graphical threshold indicator to the user;

wherein the threshold range is limited to be within a predetermined range of values representing the time or distance threshold to designated traffic;

wherein the graphical threshold indicator is one of an advisory graphical threshold indicator or an alert graphical threshold indicator, wherein a graphical appearance of the graphical threshold indicator varies at least based on whether the ownship is inside or outside of the threshold.

2. The system of claim 1, wherein the at least one processor is further configured to execute a traffic application.

3. The system of claim 2, wherein the traffic application is a cockpit display of traffic information (CDTI)-assisted visual separation (CAVS) application.

4. The system of claim 1, wherein the at least one processor is further configured to receive an initial value for the threshold range from the user and to adjust the threshold range.

5. The system of claim 1, wherein the at least one processor is further configured to determine the threshold range, to receive a user input to adjust the threshold range, and to adjust the threshold range.

6. The system of claim 1, wherein the at least one processor is further configured to at least one of determine or adjust the threshold range based at least on the aircraft traffic data, the ownship data, and a fixed offset from a range to the designated traffic, the range being a time or distance between the ownship and the designated traffic.

7. The system of claim 1, wherein the at least one processor is further configured to at least one of determine or adjust the threshold range based at least on the aircraft traffic data, the ownship data, a closure rate between the ownship and the designated traffic, and a range, the range being a time or distance between the ownship and the designated traffic.

8. The system of claim 1, wherein the at least one processor is further configured to at least one of determine or adjust the threshold range based at least on the aircraft traffic data, the ownship data, and a predetermined distance or time interval.

9. The system of claim 1, wherein the at least one processor is further configured to at least one of determine or adjust the threshold range based at least on the aircraft traffic data, the ownship data, and wake separation standards for the ownship and the designated traffic.

10. The system of claim 1, wherein the at least one processor is further configured to at least one of determine or adjust the threshold range based at least on the aircraft traffic data, the ownship data, and a time or distance between a location and the ownship.

11. The system of claim 10, wherein the location is an airport.

12. The system of claim 1, wherein the at least one processor is further configured to execute a cockpit display of traffic information (CDTI)-assisted visual separation (CAVS) application; wherein the at least one processor is further configured to at least one of determine or adjust the threshold range based at least on: the aircraft traffic data; the ownship data; a range, the range being a time or distance between the ownship and the designated traffic; a fixed offset from the range to the designated traffic; a closure rate between the ownship and the designated traffic; wake separation standards for the ownship and the designated traffic; and a time or distance between a location and the ownship; wherein the threshold range is limited to be within a predetermined range of values.

13. The system of claim 12, wherein the location is an airport.

14. A method, comprising:
receiving, by at least one processor communicatively coupled to a display, aircraft traffic data and ownship data, the display configured to present images to a user, the at least one processor and the display in an ownship;

at least one of determining or adjusting, by the at least one processor, a threshold range based at least on the aircraft traffic data and the ownship data, the threshold range representing a time or distance threshold to designated traffic;

generating and updating, by the at least one processor, a linear map including a graphical threshold indicator, the threshold indicator representing a time or distance from the threshold range to the designated traffic, the linear map depicting a one-dimensional relationship between the ownship and the designated traffic;

outputting, by the at least one processor, the linear map including the graphical threshold indicator as graphical data to the display; and displaying, by the display, the graphical threshold indicator to the user;

wherein the threshold range is limited to be within a predetermined range of values representing the time or distance threshold to designated traffic;

wherein the graphical threshold indicator is one of an advisory graphical threshold indicator or an alert graphical threshold indicator, wherein a graphical appearance of the graphical threshold indicator varies at least based on whether the ownship is inside or outside of the threshold.

15. The system of claim 1, wherein the linear map further includes a scale.

16. The system of claim 15, wherein the linear map further includes an ownship indicator.

17. The system of claim 1, wherein a graphical appearance of the graphical threshold indicator varies at least based on whether a type of threshold associated with the graphical threshold indicator is an advisory or an alert.

* * * * *